Feb. 7, 1950            D. T. HAINES            2,496,714
STAR HAND KNOB
Filed Sept. 28, 1945
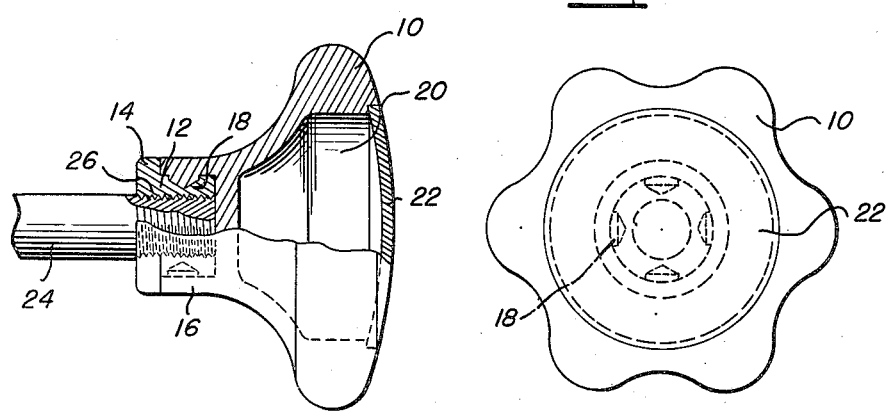
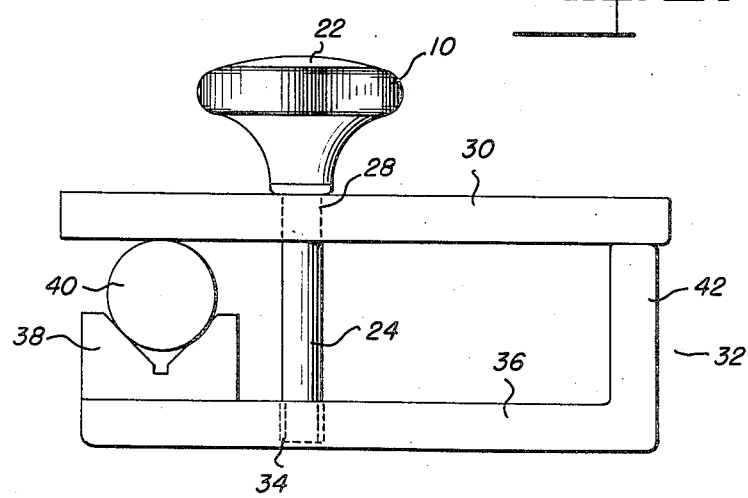
INVENTOR.
DAVID T. HAINES
BY *Victor J. Evans & Co.*
ATTORNEYS Patented Feb. 7, 1950

2,496,714

UNITED STATES PATENT OFFICE 2,496,714

STAR HAND KNOB

David T. Haines, Dallas, Tex.

Application September 28, 1945, Serial No. 619,206

1 Claim. (Cl. 16—121)

This invention relates to a star hand knob to be used for tooling purposes and the like.

An object of this invention is to provide a knob which is strong, durable and adapted to be used in clamping parts of any shape or size.

Another object of this invention is to provide a knob having a bushing cast therein for connecting a stud to the knob.

With these and other objects and advantages in view the invention consists of the novel details of construction arrangement and combination of parts more fully hereinafter described, claimed and illustrated in the accompanying drawing in which Figure 1 is a side elevation of the knob shown partly in section and partly broken away;

Figure 2 is an end view thereof, and

Figure 3 shows an application of the knob for clamping a round piece of work.

Referring more in detail to the drawing the reference numeral 10 indicates a star knob embodying the invention which can be cast of iron, bronze, or any other hard metal.

When the knob 10 is cast the internally threaded bushing 12 is cast therein. The bushing 12 is provided with a flange 14 the outer circumference of which is of the same shape and size as the outer circumference of the forward edge of the bushing holding portion 16 thereof and is positioned in contact with the edge of the portion 16. Oppositely positioned conical bottomed indentures 18 in the bushing 12 permits the metal from which the knob 10 is cast to enter therein and firmly bind the bushing 12 in the knob 10.

The knob 10 has a hollow recess 20 therein which is closed by the spring snap cover 22, and a stud 24 having a threaded end 26 is adapted to be received in the bushing 12.

In use as shown in Figure 3, the stud 24 is inserted through the opening 28 in the plate 30, of the clamp 32 and is then screwed into the threaded bore 34 of the L-shaped base 36 of the clamp 32, a V-shaped block 38 positioned on the base 36 is adapted to receive and support a piece of round work 40. Therefore when the plate 30 is positioned so that one end rests on the round work 40 and the other end rests on the upstanding end 42 of the base 36 the work 40 is clamped in position by turning the knob 10 and screwing the stud 24 into the bore 34 of the base 36.

This illustration is given to explain one of the applications of the device and is not intended to limit the invention thereto.

It is believed that the structure of the knob as described will be clear to those skilled in the art and that its application for use in tooling purposes will be apparent from the one illustration shown.

It is to be understood that the invention is not to be limited to the arrangement shown since changes therein may be made without departing from the spirit of the invention or the scope of the appended claim.

Having thus described the invention what is claimed as new and desired to be secured by Letters Patent is:

A hand gripping knob comprising a cast body having a hub with a mounting socket therein and a solid ring the axis of which is aligned with the axis of the hub, said solid ring spaced from and connected to the end of the hub opposite to that in which the socket is positioned, being connected thereto by an arcuate outwardly flared conical like web having a wall of less thickness than that of the ring and said ring having spaced arcuate lugs on the peripheral surface to facilitate gripping the knob by hand, said cast body having a conical like cavity therein opening through the ring and extending to the juncture of the hub and conical like web, said ring having a rabbet in the inner edge thereof positioned around the peripheral edge of the cavity, and an outwardly bowed plate providing a closure for the said cavity in the cast body and positioned with the edge thereof in the rabbet of the ring and secured therein by spring in the plate.

DAVID T. HAINES.

REFERENCES CITED

The following references are of record in the file of this patent:

UNITED STATES PATENTS

| Number | Name | Date |
|---|---|---|
| 421,670 | Case | Feb. 18, 1890 |
| 1,001,672 | Mueller | Aug. 29, 1911 |
| 1,132,093 | Holton | Mar. 16, 1915 |
| 1,609,724 | Kendall | Dec. 7, 1926 |
| 1,746,059 | Swanson | Feb. 4, 1930 |
| 1,823,496 | Lehnert | Sept. 15, 1931 |
| 1,919,455 | Wilson | July 25, 1933 |
| 1,929,188 | Kasch | Oct. 3, 1933 |
| 1,993,938 | McDonald | Mar. 12, 1935 |
| 1,996,357 | Voight | Apr. 2, 1935 |
| 2,131,067 | Paden | Sept. 27, 1938 |
| 2,216,467 | Falk | Oct. 1, 1940 |
| 2,425,611 | Frost | Aug. 12, 1947 |